(12) United States Patent
Kim

(10) Patent No.: US 10,985,580 B2
(45) Date of Patent: Apr. 20, 2021

(54) BATTERY PACK

(71) Applicant: Samsung SDI Co., Ltd., Yongin-si, Gyeonggi-do (KR)

(72) Inventor: Dukjung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 723 days.

(21) Appl. No.: 15/684,478

(22) Filed: Aug. 23, 2017

(65) Prior Publication Data

US 2018/0069411 A1 Mar. 8, 2018

(30) Foreign Application Priority Data

Sep. 8, 2016 (KR) .................. 10-2016-0115681

(51) Int. Cl.
| | | |
|---|---|---|
| H01H 47/22 | (2006.01) | |
| H02J 7/00 | (2006.01) | |
| B60L 3/04 | (2006.01) | |
| H02P 3/18 | (2006.01) | |
| B60L 3/00 | (2019.01) | |
| B60L 50/64 | (2019.01) | |
| B60L 58/20 | (2019.01) | |
| H01H 47/00 | (2006.01) | |
| H01H 3/00 | (2006.01) | |
| H02P 3/14 | (2006.01) | |

(52) U.S. Cl.
CPC .......... *H02J 7/0031* (2013.01); *B60L 3/0046* (2013.01); *B60L 3/04* (2013.01); *B60L 50/64* (2019.02); *B60L 58/20* (2019.02); *H02P 3/18* (2013.01); *B60L 2240/549* (2013.01); *H01H 3/001* (2013.01); *H01H 47/005* (2013.01); *H01H 47/22* (2013.01); *H02J 7/00304* (2020.01); *H02P 3/14* (2013.01)

(58) Field of Classification Search
CPC .......... B60L 3/0046; B60L 3/04; B60L 50/64; B60L 58/20; B60L 2240/549; H02J 7/0031; H02J 2007/0039; H02P 3/18; H02P 3/14; H01H 3/001; H01H 47/005; H01H 47/22
USPC .................. 307/9.1, 10.1–10.7; 320/108–109
See application file for complete search history.

(56) References Cited

U.S. PATENT DOCUMENTS

| | | | |
|---|---|---|---|
| 2009/0243554 A1 | 10/2009 | Gu et al. | |
| 2013/0154352 A1* | 6/2013 | Tokarz | .................. B60L 3/0046 |
| | | | 307/9.1 |
| 2015/0291039 A1 | 10/2015 | Sakata et al. | |
| 2019/0013168 A1* | 1/2019 | Waag | ........................ H02H 3/08 |

FOREIGN PATENT DOCUMENTS

| | | | |
|---|---|---|---|
| JP | 4586510 | B2 | 9/2010 |
| KR | 10-2009-0102896 | A | 10/2009 |
| KR | 10-2011-0123965 | A | 11/2011 |
| WO | 2014/068918 | A1 | 5/2014 |

* cited by examiner

*Primary Examiner* — Rexford N Barnie
*Assistant Examiner* — Toan T Vu
(74) *Attorney, Agent, or Firm* — Lewis Roca Rothgerber Christie LLP

(57) ABSTRACT

A battery pack includes a main switch configured to electrically connect a battery module and a load, a power supply configured to supply driving power to the main switch, and a power blocking device configured to block the driving power based on a current flowing between the battery module and the load.

6 Claims, 2 Drawing Sheets

BATTERY PACK

CROSS-REFERENCE TO RELATED APPLICATION

This application claims priority to and the benefit of Korean Patent Application No. 10-2016-0115681, filed in the Korean Intellectual Property Office on Sep. 8, 2016, the entire content of which is incorporated herein by reference.

BACKGROUND

1. Field

Aspects of the present invention relate to a battery pack.

2. Description of the Related Art

A rechargeable battery is repeatedly charged and discharged, and may be a nickel-hydrogen (Ni-MH) battery, a lithium (Li) ion battery, or the like. The rechargeable battery may be configured with one battery cell to be used in a portable small electronic device such as a mobile phone, a notebook computer, a computer, a camera, a camcorder, or the like, or it may be configured with a battery pack including the plurality of battery cells to be used as a power source for driving a motor of a high power hybrid electric vehicle (HEV), a high power electric vehicle (EV), or the like.

The battery pack includes a main switch that is electrically connected to an external load. The main switch is turned off when a short-circuit current flows between the battery pack and the external load, thereby disconnecting the battery pack from the external load. However, when a signal for controlling the main switch is delayed as a result of a short-circuit current flows through it, both ends of the main switch may be fused (or welded) to be permanently bonded.

In addition, in the fusing state of the main switch, the battery pack may ignite when a short-circuit current continuously flows due to a defect of a main fuse provided in a current path between the battery pack and the external load.

The above information disclosed in this Background section is only for enhancement of understanding of the background of the invention and therefore it may contain information that does not form the prior art that is already known in this country to a person of ordinary skill in the art.

SUMMARY

Aspects of embodiments of the present invention are directed toward a battery pack that may prevent a main switch from being fused and causing ignition, when a short-circuit current flows through the main switch electrically connecting a battery module and an external load due to a short-circuit of the battery module.

An exemplary embodiment of the present invention provides a battery pack including: a main switch configured to electrically connect a battery module and a load; a power supply configured to supply driving power to the main switch; and a power blocking device configured to block the driving power based on a current flowing between the battery module and the load.

In some embodiments, the main switch includes: a first coil having opposite ends that are connected to the power supply; first and second contact terminals that are respectively connected to one end of the battery module and one end of the load; and a third contact terminal that electrically configured to connect the first and second contact terminals when a current flows through the first coil.

In some embodiments, the power blocking device includes: an auxiliary switch configured to allow the opposite ends of the first coil to be short-circuited based on the current flowing between the battery module and the load; and an auxiliary fuse connected between one end of the first coil and the driving power supply.

In some embodiments, the auxiliary switch includes: a second coil that is coupled to a power line connecting one end of the battery module and the first contact terminal, and is configured to generate an electromotive force when an amount of a current flowing through the power line is changed; fourth and fifth contact terminals respectively connected to the opposite ends of the first coil; and a sixth contact terminal configured to electrically connect the fourth and fifth contact terminals in response to the electromotive force.

In some embodiments, the second coil is configured to generate the electromotive force that pushes the sixth contact terminal toward the fourth and fifth contact terminals when a current flowing through the power line increases due to a short circuit of the battery module.

In some embodiments, the auxiliary fuse is configured to blow by a current flowing to the short-circuited opposite ends of the first coil.

According to embodiments of the present invention, it is possible to prevent a main switch from being fused and causing ignition by immediately blocking a driving power of the main switch with a short-circuit current when a short-circuit current flows through the main switch electrically connecting a battery module and an external load due to a short-circuit of the battery module.

BRIEF DESCRIPTION OF THE DRAWINGS

These and/or other aspects will become apparent and more readily appreciated from the following description of the embodiments, taken in conjunction with the accompanying drawings.

DETAILED DESCRIPTION

Figure 1:
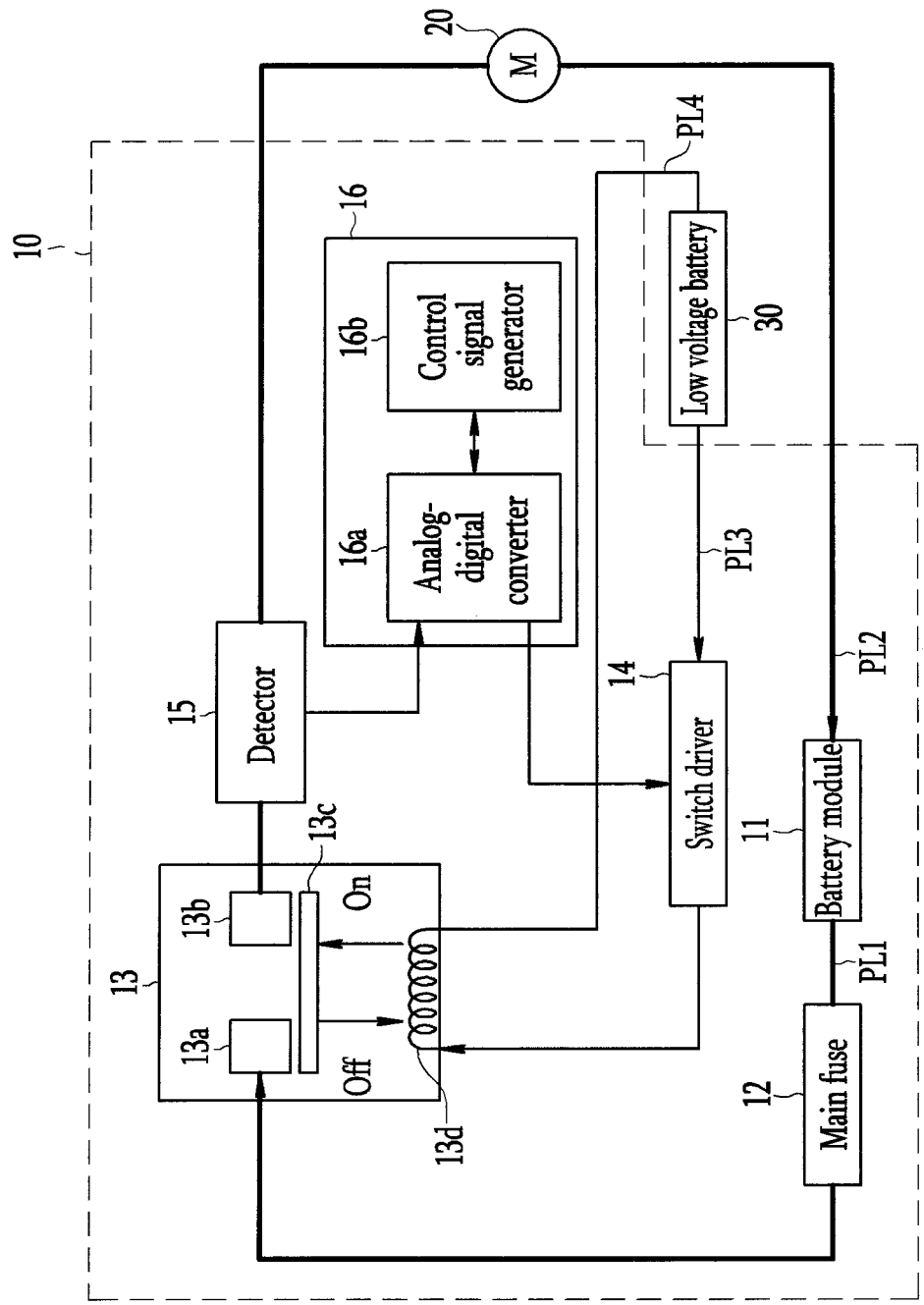
FIG. 1 illustrates a schematic view of a battery pack.

In the following detailed description, only certain exemplary embodiments of the present invention have been shown and described, simply by way of illustration. As those skilled in the art would realize, the described embodiments may be modified in various suitable ways, all without departing from the spirit or scope of the present invention. Accordingly, the drawings and description are to be regarded as illustrative in nature and not restrictive. Throughout this specification, like reference numerals designate like elements throughout the specification.

The present invention will be described more fully hereinafter with reference to the accompanying drawings, in which exemplary embodiments of the invention may be easily embodied by those skilled in the art.

FIG. 1 illustrates a schematic view of a battery pack.

Referring to FIG. 1, a battery pack 10 is electrically connected to a load 20 through first and second power lines PL1 and PL2, and is electrically connected to a low voltage battery 30 through third and fourth power lines PL3 and PL4. Here, the first and third power lines PL1 and PL3 are positive power lines, and the second and fourth power lines PL2 and PL4 are negative electrode power lines.

The battery pack 10 includes a battery module 11, a main fuse 12, a main switch 13, a switch driver 14, a detector 15, and a main controller 16. The main fuse 12 is connected between one positive end (+) of the battery module 11 and the main switch 13, and it is blown (e.g., is open-circuited) by a short-circuit current flowing through the first power line PL1 when a short circuit occurs in the battery module 11. The main switch 13 is turned on (e.g., is activated, electrically connected, or closed) or turned off (e.g., deactivated, disconnected, or opened) by the switch driver 14 to selectively connect the battery module 11 and the load 20.

Here, the main switch 13 may be configured with a contactor including first to third contact terminals (13a-13c) and a coil 13d. The main switch 13 is connected to the low voltage battery 30 by the switch driver 14, and when a current flows through the coil 13d, an electromotive force that pushes the third contact terminal 13c toward the first and second contact terminals 13a and 13b is generated in the main switch 13, thus the main switch 13 is turned on (e.g., activated, electrically connected, or closed). When the main switch 13 is disconnected from the low voltage battery 30 by the switch driver 14, the third contact terminal 13c is disconnected from the first and second contact terminals 13a and 13b and the main switch 13 is turned off (i.e., is deactivated, disconnected, or opened).

However, because the turn on/off operation of the main switch 13 is controlled by the main controller 16 corresponding to an upper controller of the switch driver 14, when a control operation by the main control unit 16 is delayed, a short-circuit current may generate heat, such that the third contact terminal 13c may be fused and permanently bonded to the first and second contact terminals 13a and 13b.

Generally, a period in which the main switch 13 is fused may be within about 50 ms after the short-circuit current occurs. The short-circuit current detected by the detector 15 may be converted into a digital signal through an analog-digital converter 16a within about 20 ms, and a time for determining whether a current that is converted into a digital signal through a control signal generator 16b is a overcurrent may be about 40 ms.

In addition, after the determining of the overcurrent, a time for generating a switch-off command for the control signal generator 16b to turn off the main switch 13 may be about 30 ms, and a time taken by the analog-digital converter 16a to convert the switch-off command into an analog signal may be about 20 ms. Further, after the current flowing through the main switch 13 is blocked by the switch driver 14 depending on the switch-off command, a time required for the electromotive force of the coil 13d to disappear (e.g., to substantially dissipate or to no longer be present) may be about 30 ms.

As a result, a total time from the time the main controller 16 detects the short-circuit current to the time that the main switch 13 is turned off may be about 140 ms. Thus, the main switch 13 may be fused, and when a short-circuit current continuously flows due to a defect of the main fuse 12, a risk of the battery pack 10 being ignited increases.

Figure 2:
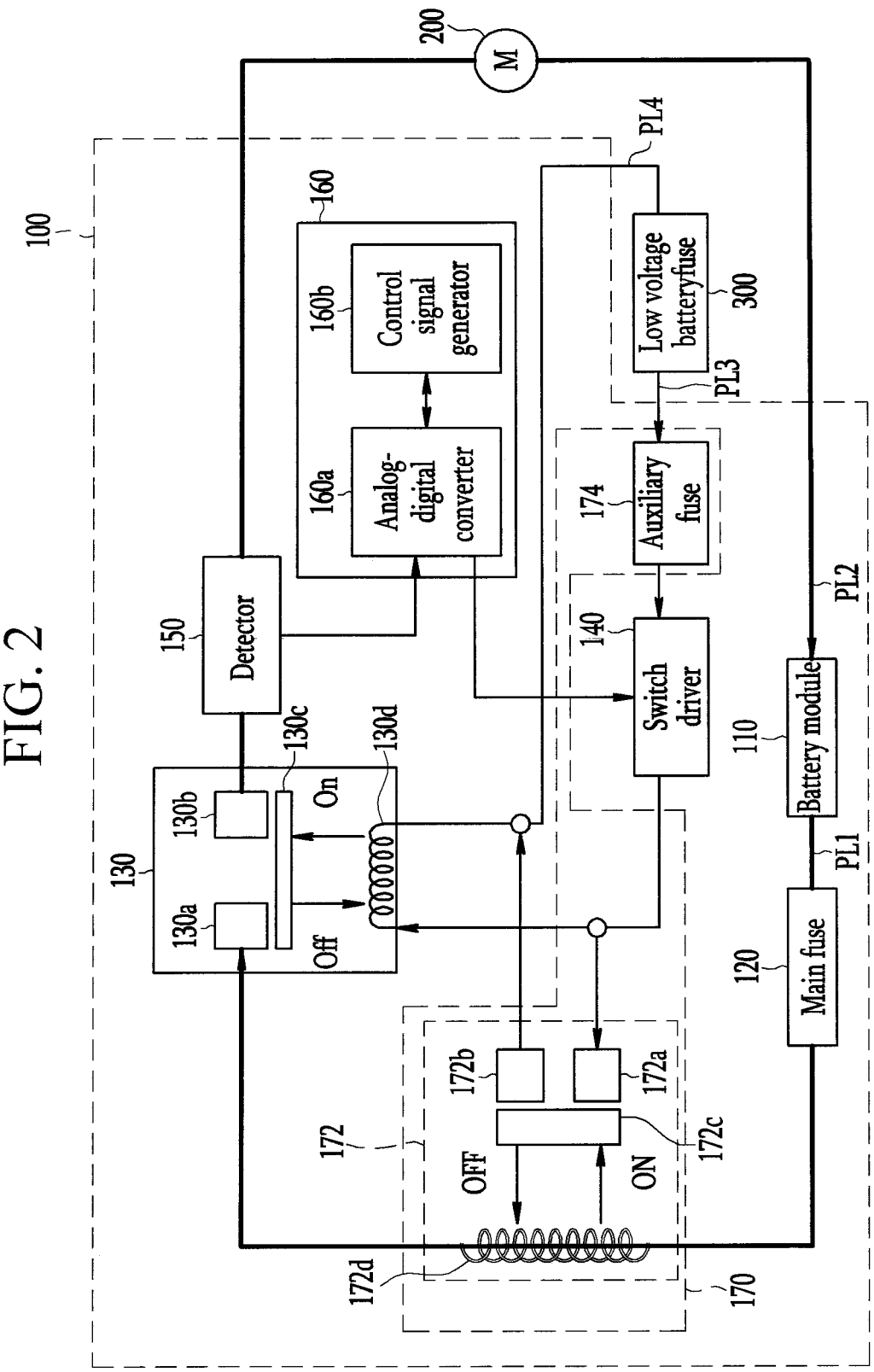
FIG. 2 illustrates a schematic view of a battery pack according to an exemplary embodiment of the present invention.

FIG. 2 illustrates a schematic view of a battery pack according to an exemplary embodiment of the present invention.

Referring to FIG. 2, a battery pack 100 according to an exemplary embodiment of the present invention is electrically connected to a load 200 through first and second power lines PL1 and PL2, and is electrically connected to a driving power supply 300 through third and fourth power lines PL3 and PL4. Here, the first and third power lines PL1 and PL3 are positive power lines, and the second and fourth power lines PL2 and PL4 are negative power lines. The driving power supply 300, which supplies driving power to components in the battery pack 100, may be a low voltage battery.

The battery pack 100 is a high voltage battery that may be repeatedly charged and discharged. When the load 200 is a vehicle motor M, the battery pack 100 may supply driving power to the vehicle motor M, and it may be charged by regenerative braking of the vehicle motor M. In addition, when the load 200 is a charger, the battery pack 100 may be charged through the charger.

In an embodiment, the battery pack 100 includes a battery module 110, a main fuse 120, a main switch 130, a switch driver 140, a detector 150, a main controller 160, and a power blocking device 170. The battery module 110 includes a plurality of battery cells connected in series between the first and second power lines PL1 and PL2.

Each of the plurality of battery cells may be configured to have a structure in which an electrode assembly including a positive electrode plate, a negative electrode plate, a separator interposed therebetween, and an electrolyte solution are accommodated in a battery case, and then the battery case is sealed. Here, the plurality of battery cells are lithium ion rechargeable batteries, but the present invention is not limited thereto, and may be applied to various suitable rechargeable batteries such as lithium polymer batteries and the like.

The main fuse 120 is disposed along the first power line PL1 between the battery module 110 and the main switch 130, and it is blown (e.g., is open-circuited) when a short-circuit current flows through the first power line PL1. The main switch 130 is disposed along the first power line PL1 between the main fuse 120 and the load 200, and is turned on or off by the switch driver 140 to selectively connect the battery module 110 and the load 200.

The main switch 130, which is a contactor, is controlled to be turned on or off by the switch driver 140 to selectively connect the battery module 110 and the load 200.

Here, the main switch 130 includes first to third contact terminals (130a to 130c) and a coil 130d. The first contact terminal 130a is connected to one end of the main fuse 120, and the second contact terminal 130b is connected to one end of the detector 150.

The third contact terminal 130c, which is an elastic spring member, electrically connects the first and second contact terminals 130a and 130b by electromotive force of the coil 130d. When the electromotive force is generated in the coil 130d, the third contact terminal 130c contacts the first and second contact terminals 130a and 130b, and when the electromotive force of the coil 130d disappears (e.g., substantially dissipates or is no longer present), the third contact terminal 130c is disconnected from the first and second contact terminals 130a and 130b. The coil 130d is connected between the third and fourth power lines PL3 and PL4, and an electromotive force is generated therein when a current flows through both ends of the coil 130d.

The switch driver 140 is disposed along the third power line PL3 between the coil 130d and the driving power supply 300, and is controlled by the main controller 160 to supply driving power of the driving power supply 300 to the main switch 130. For example, the switch driver 140 may include a switch that is turned on or off by the main controller 160 to selectively connect one end of the coil 130d and one end of the driving power supply 300.

The detector 150 is disposed along the first power line PL1 between the main switch 130 and the load 200, and detects a current flowing through the first power line PL1. For example, the detector 150 may include a resistor connected between the switch driver 140 and the load 200.

The main controller 160 compares a current detected by the detector 150 with a reference current (e.g., a predetermined reference current) to determine whether the detected current is an overcurrent, and when the detected current is the overcurrent, the main controller 160 generates a switch-off signal for turning off the main switch 130 to transmit it to the switch driver 140.

In an embodiment, the main controller 160 includes an analog-digital converter 160a and a control signal generator 160b. The analog-digital converter 160a converts a current detected by the detector 150 into a digital signal to transmit it to the control signal generator 160b. The analog-digital converter 160a converts a switch-off command generated by the control signal generator 160b into an analog signal to transmit it to the switch driver 140.

The control signal generator 160b compares the current converted into the digital signal with the reference current, and when an amount of the current is larger than that of the reference current, the control signal generator 160b determines the current as an overcurrent, and generates a switch-off command to transmit it to the analog-digital converter 160a.

When a short-circuit current flows through the first power line PL1, the power blocking device 170 disconnects the connection between the main switch 130 and the driving power supply 300. That is, the power blocking device 170 blocks the driving power supplied to the main switch 130 when the current flowing through the first power line PL1 becomes larger due to the short circuit of the battery module 110.

In an embodiment, the power blocking device 170 includes an auxiliary switch 172 and an auxiliary fuse 174. When a short-circuit current flows through the first power line PL1, the auxiliary switch 172 allows both ends of the third and fourth power lines PL3 and PL4 to be short-circuited. In an embodiment, the auxiliary switch 172 includes first to third contact terminals (172a to 172c) and a coil 172d. The first contact terminal 172a is connected to the third power line PL3, and the second contact terminal 172b is connected to the fourth power line PL4.

The third contact terminal 172c, which is an elastic spring member, electrically connects the first and second contact terminals 172a and 172b by electromotive force of the coil 172d. When the electromotive force is generated in the coil 172d, the third contact terminal 172c contacts the first and second contact terminals 172a and 172b, and when the electromotive force of the coil 172d disappears (e.g., substantially dissipates or is no longer present), the third contact terminal 172c is disconnected from the first and second contact terminals 172a and 172b. The coil 172d is disposed along the first power line PL1, and electromotive force is generated by a short-circuit current flowing through the first power line PL1.

That is, when an amount of the current flowing through the first power line PL1 is changed due to the short circuit of the battery module 110, a magnetic field is generated in the coil 172d. Thus an electromotive force that pushes the third contact terminal 172c toward the first and second contact terminals 172a and 172b is generated. Thus, both ends of the third and fourth power lines PL3 and PL4 are short-circuited, and a path of the short-circuit current is formed from a positive electrode end (+) of the driving power supply 300 to the auxiliary fuse 174, the switch driver 140, and a negative electrode end (−) of the driving power supply 300.

The auxiliary fuse 174 is disposed along the third power line PL3 between the switch driver 140 and the driving power supply 300, and it is blown (e.g., is open-circuited) when a short-circuit current flows through the third power line PL3. The auxiliary fuse 174 according to the exemplary embodiment of the present invention may be designed to be blown (e.g., be open-circuited) before the main switch 130 is fused after the battery module 110 is short-circuited.

For example, when it takes about 50 ms from when the battery module 110 is short-circuited to when the main switch 130 starts to be fused and it takes about 30 ms from when the current flowing through the coil 130d is blocked to when the electromotive force of the coil 130d disappears (e.g., substantially dissipates or is no longer present), the auxiliary fuse 174 may be designed to be blown (e.g., be open-circuited) within about 10 ms, and preferably about 5 ms, from the start of the short-circuit current in consideration of a margin. Design specifications of the auxiliary fuse 174 may be designed based on a voltage of the driving power supply 300, a weight of copper (Cu) contained in the auxiliary fuse 174, a length of the auxiliary fuse 174, and the like.

As such, in the battery pack according to the exemplary embodiment of the present invention, when the short circuit current flows through the first and second power lines PL1 and PL2 due to the short circuit of the battery module 110, both ends of the third and fourth power lines PL3 and PL4 are short-circuited by the auxiliary switch 172, and the auxiliary fuse 174 is blown (e.g., is open-circuited) by the short-circuit current flowing through the third and fourth power lines PL3 and PL4. As a result, when the short-circuit current flows through the first and second power lines PL1 and PL2, regardless of the controlling of the main controller 160, the driving power of the main switch 130 is immediately blocked, thus the main switch 130 is turned off. Accordingly, it is possible to prevent the main switch 130 from being fused by the short-circuit current flowing through the main switch 130.

In an embodiment, because it takes about 5 ms until the auxiliary fuse 174 is blown (e.g., is open-circuited) after the short-circuit current starts to flow through the main switch 130 and it takes about 30 ms until the electromotive force of the coil 130d disappears (e.g., substantially dissipates or is no longer present) after the current flowing through the coil 130d is blocked, the main switch 130 is turned off after about 35 ms after the short-circuit current starts to flow through the main switch 130.

That is, before the main switch 130 is fused, the main switch 130 is turned off, thereby preventing a permanent failure of the main switch 130. In addition, the battery module 110 may be safely disconnected from the load 200 even when a failure occurs in the main fuse 120 or even when the controlling of the main controller 160 is delayed or has failed.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The battery pack and/or any other relevant devices or components according to embodiments of the present invention, such as the control signal generator, described herein may be implemented utilizing any suitable hardware, firmware (e.g. an application-specific integrated circuit), software, or a suitable combination of software, firmware, and hardware. For example, the various components of the battery pack may be formed on one integrated circuit (IC) chip or on separate IC chips. Further, the various components of the battery pack may be implemented on a flexible printed circuit film, a tape carrier package (TCP), a printed circuit board (PCB), or formed on a same substrate. Further, the various components of the battery pack may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in connection with what is presently considered to be practical exemplary embodiments, it is to be understood that the invention is not limited to the disclosed embodiments, and is intended to cover various suitable modifications and equivalent arrangements included within the spirit and scope of the appended claims and equivalents thereof.

DESCRIPTION OF SOME OF THE REFERENCE NUMERALS

110: battery module
120: main fuse
130: main switch
140: switch driver
150: detector
160: main controller
170: power blocking device

What is claimed is:

1. A battery pack comprising:
    a main switch comprising a first coil and configured to electrically connect a battery module and a load;
    a power supply configured to supply driving power to the main switch; and
    a power blocking device configured to block the driving power based on a current flowing between the battery module and the load, the power blocking device comprising an auxiliary switch configured to allow opposite ends of the first coil to be short-circuited based on the current flowing between the battery module and the load.

2. The battery pack of claim 1, wherein the main switch comprises:
    first and second contact terminals that are respectively connected to one end of the battery module and one end of the load; and
    a third contact terminal configured to electrically connect the first and second contact terminals when a current flows through the first coil, and
    wherein the opposite ends of the first coil are connected to the power supply.

3. A battery pack comprising:
    a main switch configured to electrically connect a battery module and a load;
    a power supply configured to supply driving power to the main switch; and
    a power blocking device configured to block the driving power based on a current flowing between the battery module and the load,
    wherein the main switch comprises:
        a first coil having opposite ends that are connected to the power supply;
        first and second contact terminals that are respectively connected to one end of the battery module and one end of the load; and
        a third contact terminal that electrically configured to connect the first and second contact terminals when a current flows through the first coil, and
    wherein the power blocking device comprises:
        an auxiliary switch configured to allow the opposite ends of the first coil to be short-circuited based on the current flowing between the battery module and the load; and an auxiliary fuse connected between one end of the first coil and the power supply.

4. The battery pack of claim 3, wherein the auxiliary switch comprises:
   a second coil that is coupled to a power line connecting one end of the battery module and the first contact terminal, and is configured to generate an electromotive force when an amount of a current flowing through the power line is changed;
   fourth and fifth contact terminals respectively connected to the opposite ends of the first coil; and
   a sixth contact terminal configured to electrically connect the fourth and fifth contact terminals in response to the electromotive force.

5. The battery pack of claim 4, wherein the second coil is configured to generate the electromotive force that pushes the sixth contact terminal toward the fourth and fifth contact terminals when a current flowing through the power line increases due to a short circuit of the battery module.

6. The battery pack of claim 3, wherein the auxiliary fuse is configured to blow by a current flowing to the short-circuited opposite ends of the first coil.

\* \* \* \* \*